April 1, 1930.  A. G. DECKER  1,752,422
PORTABLE ELECTRIC TAPPER
Filed March 15, 1926  2 Sheets-Sheet 1
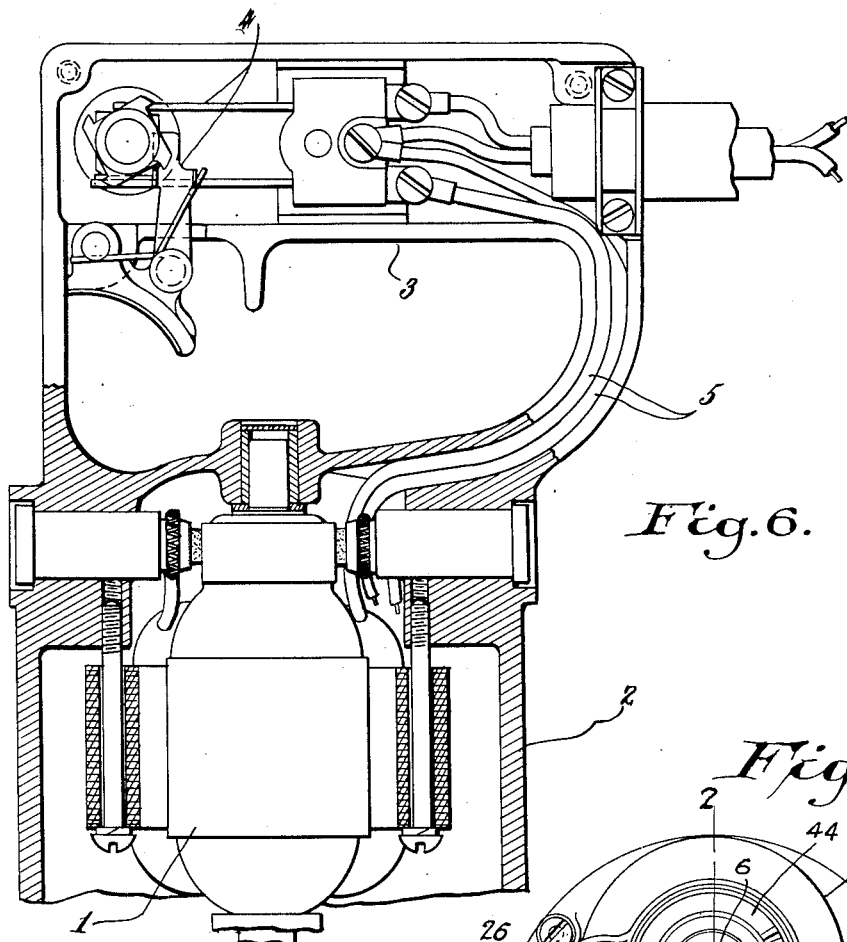
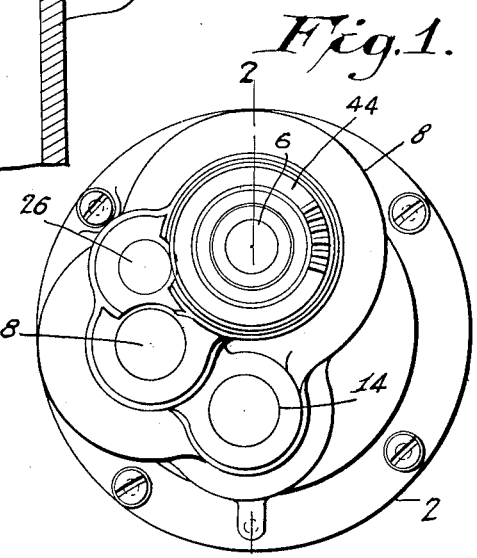
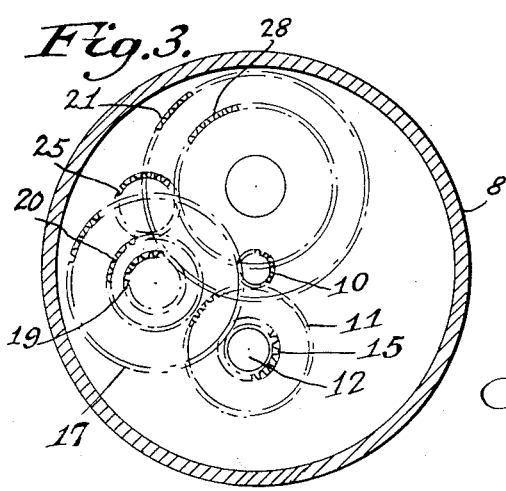
Inventor
Alonzo Galloway Decker
By Edwin L. Samuels
Attorney

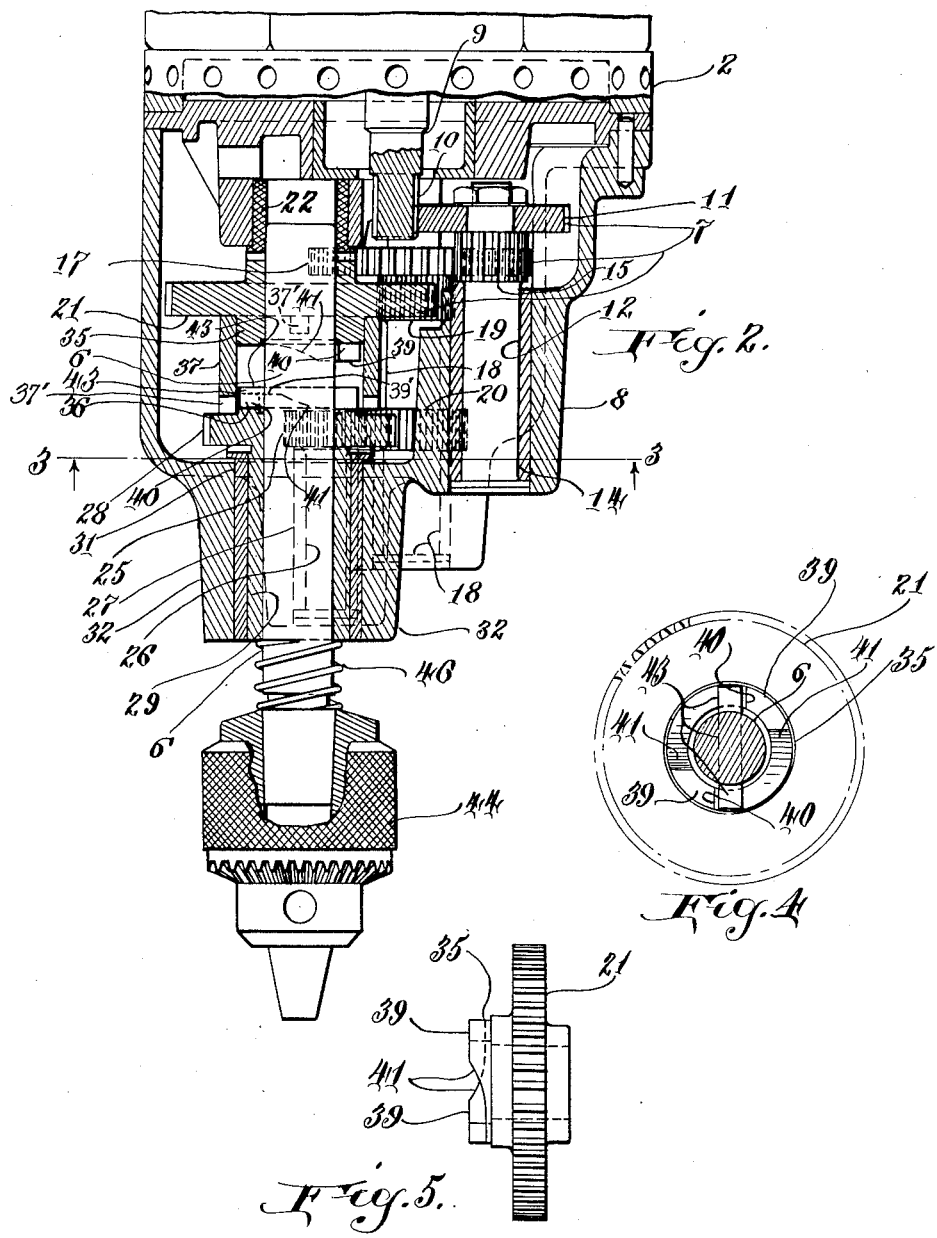

Patented Apr. 1, 1930

1,752,422

UNITED STATES PATENT OFFICE

ALONZO GALLOWAY DECKER, OF BALTIMORE COUNTY, MARYLAND, ASSIGNOR TO THE BLACK & DECKER MANUFACTURING COMPANY, OF TOWSON, MARYLAND, A CORPORATION OF MARYLAND

PORTABLE ELECTRIC TAPPER

Application filed March 15, 1926. Serial No. 94,831.

Tapping attachments for use with a drill press or other power driven drill have been described in numerous patents and used to some extent, but such tapping attachments being temporarily connected to the drill spindle are difficult of alignment and, on account of the temporary connection, more or less uncertain in their operation, and apt to be dislocated or displaced from the drill spindle to the detriment of the quality of the work in hand. To overcome these difficulties is the object of the present invention.

The invention as distinguished from these attachments relates to an integral unitary structure in the nature of a portable power driven electric tool, primarily adapted for use as a tapper or tapping tool.

In the improved device the tap is inserted in a chuck mounted directly on the spindle of the tool, the spindle being in the tool of the invention mounted to slide in its bearings in the direction of its length, and so arranged that in retracted postion it is driven in right handed rotation for the cutting or tapping operation and in advanced position it is driven in left handed rotation, providing for the removal of the tap from the threaded hole.

Other important features of the invention are the mounting of the spindle in an elongated bearing in the tool casing or frame supporting the spindle to a point near the chuck and eliminating any tendency to yield laterally, whereby inaccuracies and breaking of taps, due to failure to secure accurate alignment, are avoided. Another feature is the provision of a reducing gear giving a comparatively slow speed and increased power in the tapping operation. The machine also includes other features and details incidental to the improved result obtained.

In the accompanying drawings I have illustrated a portable electric tapper embodying the features of my invention in the preferred form.

In the drawings:

Figure 1 is a bottom plan view of the tool.

Figure 2 is a section on the line 2—2 of Figure 1.

Figure 3 is a section on the line 3—3 of Figure 2.

Figure 4 is a bottom plan of the tapping in gear.

Figure 5 is a side view of the same.

Figure 6 is a central section on the line of the motor axis showing the arrangement of the casing, motor and switch above the gear case, the latter being particularly illustrated in Figure 2. Figures 2 and 6 together illustrate the complete tool.

Referring to the drawings by numerals, each of which is used to indicate the same or similar parts in the different figures, the machine or portable electric tapper in the preferred form, as shown, comprises a motor 1 enclosed in tool casing 2, which may have a grip 3 containing a trigger actuated or other suitable switch 4 with connections 5 to the motor, also spindle 6 driven by the motor 1 by and through reducing gears 7 in the gear casing 8, which is part of tool casing 2.

More particularly, the motor shaft 9 carries a pinion 10 which may be secured to or formed integrally the shaft, as shown. This meshes with first intermediate gear 11 which is secured to a shaft 12 mounted in a suitable elongated bearing 14 in the frame. A pinion 15 is secured to the gear 11 or the shaft 12 or cut in said shaft and meshes with and drives second intermediate gear 17 which is secured to shaft 18 in suitable bearings in the frame and carries pinion 19 which is cut in or secured to shaft 18 and rotates with the gear 17. The shaft 18 also carries cut in the shaft or secured thereto and spaced downwardly from pinion 19, a pinion 20.

The upper pinion 19 meshes directly with the gear 21, known as the spindle gear or tapping in gear. The gear 21 rotates on spindle 6. The spindle 6 rotates in bearings 22 at its upper end in the casing and slides in and relatively to the tapping in gear 21. The pinion 20 meshes with an idler gear 25 mounted on a stud 26 in an elongated bearing 27 in the frame. This idler gear 25 in turn meshes with the tapping out gear 28 which rotates on the spindle 6 and in the form shown has an elongated downwardly projecting hub or sleeve 29 which encloses and acts as a bearing for the spindle shaft and in turn rotates in a corresponding elongated bearing 31 in a projecting portion 32 of the frame or gear casing 8, provided for this purpose.

The interposition of the idler 25 between the pinion 20 and the tapping out gear 28 imparts to the latter an opposite rotation to that of the tapping in gear or spindle gear 21. The tapping in gear 21 is provided with a downwardly projecting hub or boss 35 and the tapping out gear 28 has an upwardly projecting hub or boss 36 and the gears 21 and 28 are spaced by a collar or sleeve 37 referred to hereinafter in a general way as a spacing member, which encloses the respective hubs 35 and 36 at its opposite ends. This sleeve 37 is shown as notched at the ends at 38' to facilitate the admission of lubricant to the clutch members and the portion of the spindle within the sleeve. The hubs 35 and 36 are provided on their opposed surfaces with teeth 39, 39' which present opposed flat surfaces 40 in radial and axial planes, the opposite surfaces of the teeth being preferably inclined as indicated at 41, and the shaft is provided with driving lugs 43 which may be in the form of a square pin mounted in a suitable slot in the spindle and projecting on both sides.

The portable electric tapper, as shown, is provided with any suitable type of chuck 44 secured to the end of the spindle, the chuck shown being an ordinary three jaw drill chuck, and preferably a light helical spring 46 is placed on the shaft encircling the shaft between the chuck 44 and the end of the projecting hub portion 29 of the gear and bearing against both members, the spring having the effect of normally thrusting the spindle downwardly to its lowest position, in which the driving lug or pin 43 engages the tapping out gear teeth, holding it in engagement therewith. This prevents floating of the driving lugs between the tapping in gear and tapping out gear, which in many instances otherwise results in disastrous hammering.

The operation of the electric tapper will be understood from the description and drawings. A proper sized hole is first drilled at the point determined and the tap being gripped in the chuck is entered in the hole and pressure is applied to the tool which disengages the pin or lugs 43 from the tapping out gear and engages them with the tapping in gear which is running in right handed rotation. When the hole has been tapped to the proper depth, a pull is exerted on the tool which permits the pin or lugs 43 to become disengaged from the tapping in gear and causes it to become engaged with the tapping out gear, thereby imparting reverse rotation and backing the tap from the hole.

The tapper can also be used to thread stock by substituting a die head for the tap.

I have thus described specifically and in detail a single embodiment of my portable electric tapper in order that the nature and operation of the same may be clearly understood, however, the specific terms herein are used descriptively rather than in a limiting sense, the scope of the invention being defined in the claims.

What I claim and desire to secure by Letters Patent is:

1. In a portable power driven tapper, a tool casing, a motor therein, a spindle mounted to rotate in the casing, tapping in and tapping out gears mounted to rotate on the spindle and relatively thereto, said gears having clutch members, the spindle being mounted to slide and having a clutch member between the gears, means spacing the gears apart, a means tending to move the spindle to one end of its traverse, bringing the clutch member thereon into cooperative relation with the clutch member on one gear at one end of its traverse, the pressure of the tool against the work serving to return said clutch member, bringing it into engagement with the clutch member on the other gear at the other end of said traverse, and means connecting said motor to said tapping in and tapping out gears comprising a shaft having an elongated bearing in the frame, two pinions on the shaft, one said pinion meshing with one said gear, an idler meshing with the other of said pinions and with the other said gear, a gear for driving said shaft and means driving said latter gear from the motor.

2. A portable power driven tapper in the form of a unitary tool structure having a motor, a casing enclosing the motor, a spindle mounted to slide in the casing in the direction of its length from advanced to retracted position and vice versa, gearing connecting the motor to the spindle to drive the same at a slow speed for tapping in, gear connections from the motor to the spindle to drive the spindle in the opposite direction for withdrawing the thread cutting tool, means connecting the spindle to the first mentioned gearing in the retracted position of the spindle and to the second set of gearing in the advanced position of the spindle, said gearing being mounted and enclosed within the casing, the frame having a projecting portion and an elongated bearing for the spindle in said projecting portion whereby the spindle is supported to a point relatively near the tapping tool and means for suporting said tapping tool on the end of the spindle.

3. In a portable electric tapper a spindle carrying a chuck for a tapping tool and mounted to slide in the direction of its length, tapping in and tapping out gears mounted on said spindle to rotate freely relatively thereto, clutch members on the adjacent surfaces of the respective tapping in and tapping out gears, a spacing member encircling the spindle and adapted to engage opposed surfaces of the gears to space them apart, and a third clutch member secured to the spindle between said gears and inside said spacer member, a spring tending to move the spindle to one end of its traverse, the pressure of the tool against the work tending to move the spindle to the opposite end of its traverse against the spring pressure, the said third clutch member on the spindle being moved by the traverse of the spindle from engagement with one clutch member on one gear into engagement with the other clutch member on the other gear and vice versa, an electric motor, means for driving the tapping in gear from said motor and means for driving the tapping out gear likewise from said motor in the opposite direction and at a reduced speed.

Signed by me at Baltimore, Maryland, this 9th day of March, 1926.

ALONZO GALLOWAY DECKER.